United States Patent [19]
Morris

[11] 4,433,879
[45] Feb. 28, 1984

[54] ADJUSTABLE EXTENSION-CAM SHIM

[76] Inventor: James C. Morris, 9860 Ravenna Rd., Twinsburg, Ohio 44087

[21] Appl. No.: 250,320

[22] Filed: Apr. 2, 1981

[51] Int. Cl.³ .................... F16C 33/00; F16B 41/00
[52] U.S. Cl. .................................. 308/244; 411/535
[58] Field of Search ............... 308/244, 199, 207 R, 308/178, 207 A, 189 A; 16/2; 192/93 A; 411/535, 536, 149, 150; 403/388, 408, 161, 162

[56] References Cited

U.S. PATENT DOCUMENTS

| | | | |
|---|---|---|---|
| 45,297 | 11/1864 | Hamilton . | |
| 487,721 | 12/1892 | DeKalb . | |
| 840,306 | 1/1907 | Farmer | 308/189 A |
| 1,386,317 | 8/1921 | Claassen . | |
| 1,435,433 | 11/1922 | Triggs . | |
| 1,953,354 | 4/1934 | Holland-Letz . | |
| 2,405,889 | 8/1946 | Kennedy . | |
| 2,585,569 | 2/1952 | Meneely et al. . | |
| 3,830,484 | 8/1974 | Bright et al. . | |
| 6,386,692 | 12/1899 | Banwell . | |

*Primary Examiner*—Stuart S. Levy
*Assistant Examiner*—Thomas R. Hannon
*Attorney, Agent, or Firm*—Robert Bruce Henn

[57] ABSTRACT

A pair of matched, serrated cams can be used as an adjustable shim to fill the gap between two fixed abutments. The overall length of the shim is externally adjustable after installation. Each matching cam may have more than one ramp surface, depending upon the conditions of restraint of the shims in a particular application.

1 Claim, 6 Drawing Figures

ADJUSTABLE EXTENSION-CAM SHIM

BACKGROUND OF THE INVENTION

1. Field of the Invention

This invention relates to extension cams which are adjustable prior to assembly and thereafter adjustable by engagement of a tool with depressions in either a smooth face of either cam, or a ridged or knurled edge. Such cams are provided with matching stepped serrations (hereinafter "serrated" cams) in serrated ramp surfaces which, after being fixed in position, allow no relative rotational movement between each other.

2. Description of the Prior Art

The use of shims is well known in a wide variety of mechanical arts. Shims are used to provide a close fit of a part or a device in an opening, where the opening is somewhat larger than the device in at least one dimension. Examples include automobile-engine bearings, residential construction and furniture.

In the past, shims have either been manufactured for the specific application, or have been tailored to fit by, e.g., removing laminations from prepared shim stock. In some cases, shims have been used where some adjustment was possible, but these could only be adjusted before installation, and once in place, no shim has heretofore been capable of adjustment, either to accommodate for existing spacing, or to compensate for wear.

SUMMARY OF THE INVENTION

This invention comprises a new adjustable shim having utility in adjustably varying the effective overall axial length thereof, both prior and subsequent to locking the two pieces to preclude inadvertent relative rotational movement therebetween.

This invention provides a preadjustable shim or spacer which comprises two complementary parts, each part with one or more matching serrated ramp surfaces. Each ramp surface is a segment of a spiral. The two complementary parts of the shim may be preadjusted with each serration of one part interlocked with a matching serration of the other part, thus providing the minimum overall length of the two-part spacer. Alternatively, the two complementary parts of the shim may be preadjusted to provide a shim having an overall length intermediate the minimum and maximum extensions.

Because it is often difficult to predetermine the exact spacing required before placing the shim assembly in the apparatus where the shim is used, the shim is provided with external adjustment means comprising recesses in the end faces or the sides of either or both pieces of the shim.

DESCRIPTION OF THE PREFERRED EMBODIMENTS

Figure 2:
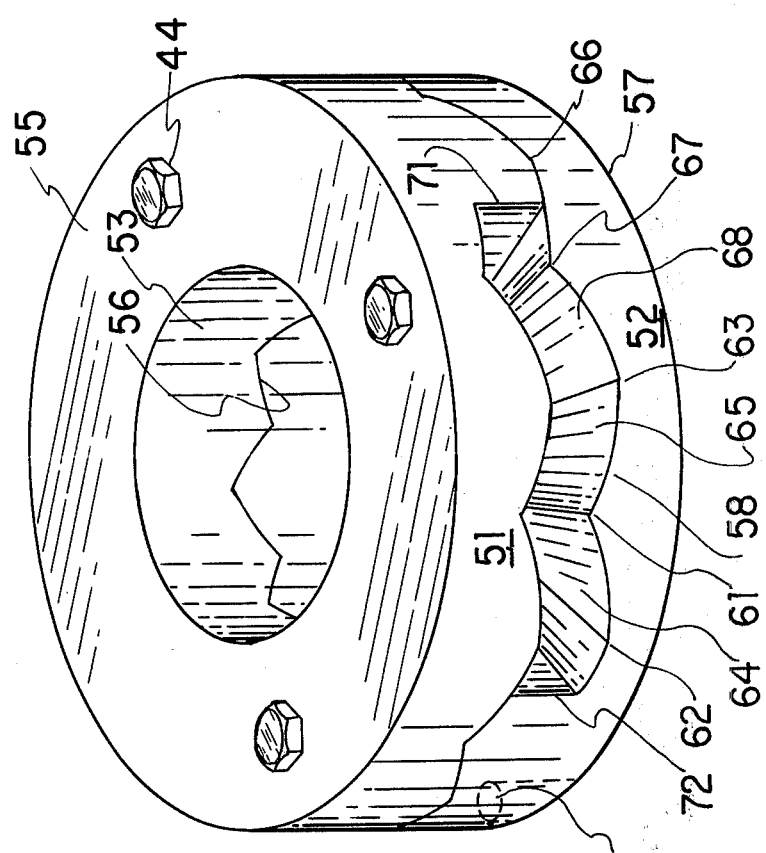
FIG. 2 shows, on an enlarged scale, a perspective view of a serrated two-piece shim with a series of stepped circumferential serrations.
Figure 1:
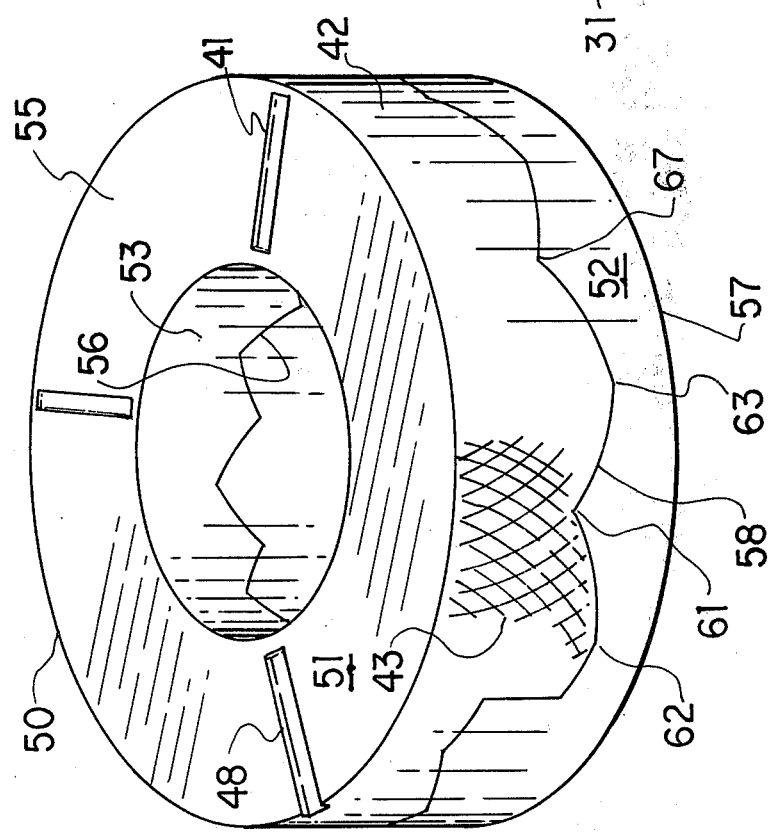
FIG. 1 illustrates, on an enlarged scale, a perspective view of a serrated two-piece shim.

The present invention will be understood by those skilled in the art by reference to FIGS. 1 and 2, which are views in perspective of one embodiment of the present invention.

FIGS. 1 and 2 show a serrated two-piece shim referred to generally by reference numeral 50, which comprises a first serrated extension cam 51 and a second serrated extension cam 52. Each of the two pieces 51 and 52 is a cylindrical segment, each having aligned longitudinal axial bores 53 and 54 respectively. Either axial bore 53 or 54 can be threaded. In one embodiment, either axial bore can terminate in a relief at the planar end surface 55. In the embodiment illustrated, the bores 53 and 54 are of the same diameter, and the pieces 51 and 52 are also of the same outside diameter. Cam 51 is provided with a planar end surface 55 having disposed therewithin longitudinal depressions 41 and a serrated end surface 56. The vertical wall 42 of cam 51 is shown with a knurled surface 43. Cam 52 is provided with a planar end surface 57 and a serrated end surface 58. As illustrated in FIG. 1, the serrated end surfaces 56 and 58 are matched, so that one complementarily fits the other, and end surfaces 55 and 57 are parallel to each other and orthogonal to the longitudinal axis of the cams 51 and 52. Longitudinal depressions 41 and knurling on surface 42 permit adjustment of the cam spacing after assembly. This adjustment is achieved by, e.g., using a screwdriver or other appropriate tool in any depression 41 to turn cam 51 in a counterclockwise direction to increase the relative height or thickness of the shim. Alternatively, a pointed tool could be used on the knurling on surface 42 to move one cam relative to the other. In FIG. 1, there is also shown depression 48, which extends into wall 42, providing alternative adjustment means for cam 51.

As used in this specification, the term "adjustment surface" refers to the surface of a cam, whether planar or cylindrical, which has adjustment means incorporated thereinto. Thus, an adjustment surface can comprise, e.g., depression 48 in surfaces 43 and 55, or projections 44 on surface 55.

Each serrated end surface comprises plural serrations which extend circumferentially in stepped relationship with each other. A serration is defined herein, for the purposes of illustration, as a single saw-tooth-shaped projection. It will be obvious to one skilled in the art, however, that rectangular, trapezoidal, or other shapes of projections could be used without materially changing the operation of the cams. As illustrated in FIGS. 1 and 2, a serration in cam 52 includes a peak 61 with valleys 62 and 63 on each side. Since each serration extends the radial width of an annular segment of each cam, it will be seen that inclined surfaces 64 and 65 connect valleys 62 and 63 to peak 61. Another vertically incremental serration immediately follows, defined by peak 67 with valleys 63 and 66 on each side connected to the peak by inclined surfaces 68 and 69 respectively. The elevational profile of each serration is the same. However, valley 63 is incrementally upwardly stepped from valley 62, and valley 66 is incrementally upwardly stepped from valley 63; peak 67 is incrementally upwardly stepped from peak 61, thus forming a series of stepped circumferential serrations.

The serrated end surface 56 of cam 51 is provided with stepped circumferential serrations each having the same elevational profile as the serrations of cam 52, except that they are inverted. In other words, the serrations of cams 51 and 52 are matched, the peak of a serration in one cam fitting in the valley of the other cam. As seen in FIG. 1, every peak of one cam fits into a valley of the other cam, leaving no space longitudinally between planar surfaces 55 and 57. The surfaces 55 and 57 are as close together as possible and the shim 50 is at its minimum length.

In FIG. 2, there are shown polygonal projections 44 on surface 55 of cam 51. These projections 44 provide an alternative means for adjusting the effective overall length of shim 50. In this embodiment, a tool such as, e.g., a wrench having parallel jaws can be used to impart torsional movement to cam 51, thus effective relative movement of the cams, one to the other. It will be apparent to those skilled in the art that a plurality of projections can be used, and that the exact shape of the projection is not critical, so long as a tool with appropriate shape to engage the projection is used.

In FIG. 2, lower cam 52 can be prevented from turning with respect to the apparatus in which it is installed by any convenient means such as, e.g., pin 31, shown in partial phantom view. Pin 31 can communicate with the apparatus through surface 57, as shown in FIG. 2, or through a cylindrical surface. Those skilled in the art will realize that other means of preventing the cam from turning can be used, such as, e.g., welding, brazing or press-fitting. While the means by which lower cam 52 is held in place is not critical to the present invention, preventing it from rotation with respect to the apparatus renders possible adjustment of the thickness of shim 50 without access to lower cam 52.

As seen in FIGS. 1 and 2, the serrations of ends 56 and 58 of the cams are stepped incrementally along the entire circumference. The initial step and last step of each cam are separated by vertical walls 71 and 72 in cams 51 and 52 respectively. If, for example, each serration is stepped to increase the axial spacing between surfaces 55 and 57 by 0.010 in., and there are ten serrations provided in the circumference, the relative positions of cams 51 and 52 in FIG. 2 indicate an increase of 0.030 in. for the length of the shim 50. Irrespective of the complementarily interfitted cams 51 and 52, there can be adjustment after interfitting by means as herein described. In other words, an adjustment to vary the overall length of the shim must be made by axially displacing one cam relative to the other to clear the height of a serration which would otherwise interfere with relative rotational movement of the cams 51 and 52. This characteristic, namely that the cams are preadjustable, or adjustable either prior to or after assembly, obtains irrespective of whether the inclined surfaces 64, 65, 68, 69 are arcuate or planar and whether the entire shape of the serrations is modified as mentioned hereinabove. How this characteristic obtains will be more easily seen by reference to FIG. 3 which illustrates an exploded view of the cams 51 and 52. It will also be apparent that as the number of stepped serrations becomes very large, and the increments between successive serrations become very small, the serrated end surfaces 56 and 58 will approach a continuous smooth surface as a limiting condition.

Figure 3:
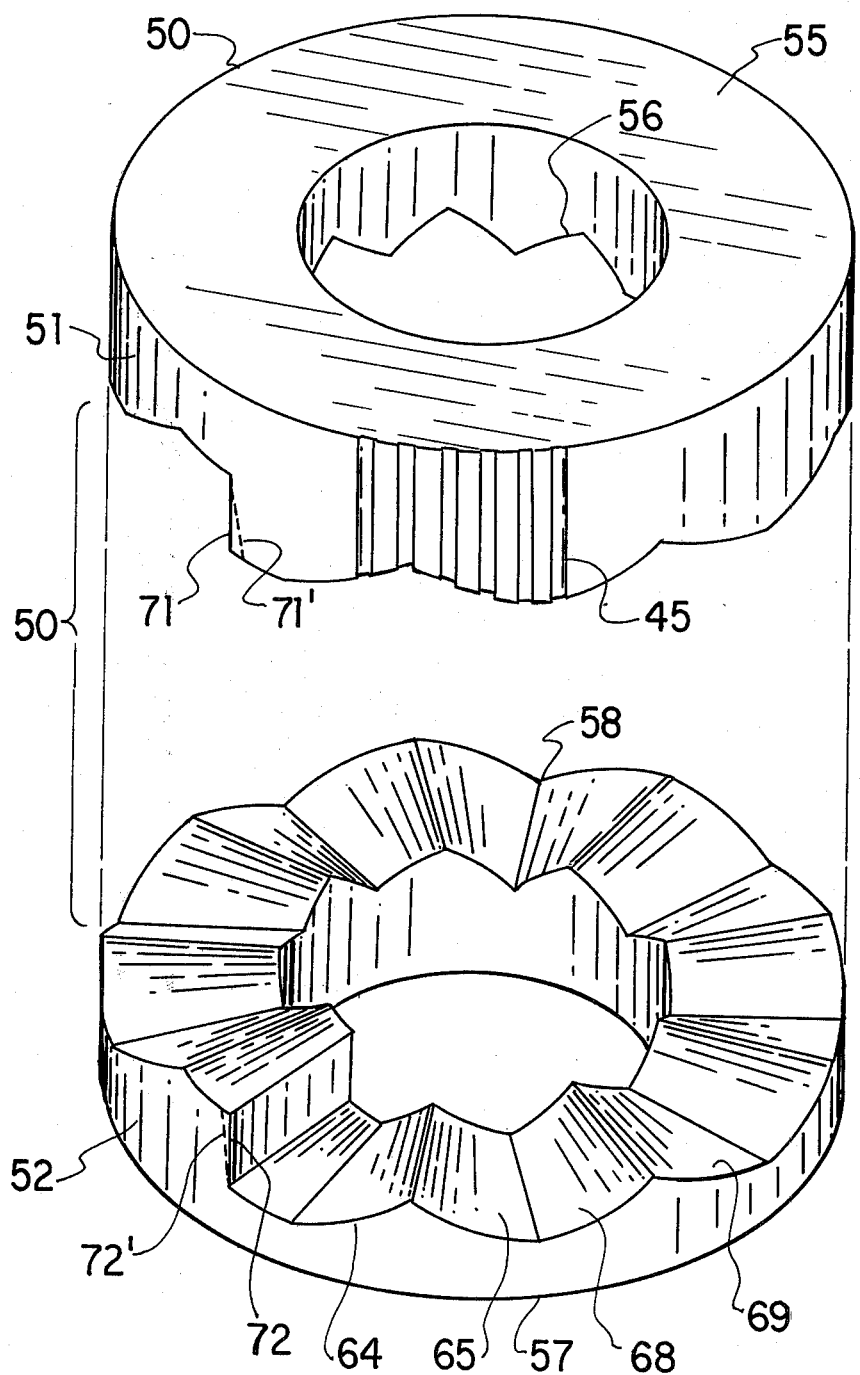
FIG. 3 is an exploded view of the two-piece serrated shim.

The shim 50 described hereinabove comprises two cams 51 and 52, each of which has stepped identical serrations on an end surface, which serrations are interrupted by a single wall, 71 or 72 respectively, demarcating the lowest or initial serration from the highest or last serration. In other words, shim 50 has a single serrated ramp. However, a shim may have plural ramps, each extending over a predetermined segment of the circumference, and each ramp on an end surface being identical with a complementary ramp on the mating end surface. Though walls 71 and 72 are shown as being vertical, it may be desirable, for ease of manufacture, that the walls be slightly inclined from the vertical. As shown in phantom outline in FIG. 3, the vertical wall 71 is replaced by an inclined wall 71' and vertical wall 72 is replaced by an inclined wall 72'. In FIG. 3 there is also shown a series of vertical longitudinal depressions 45 on the vertical surface of cam 51. These depressions serve the same function as depressions 41 or knurling 43, referred to with respect to FIG. 1.

Figure 4:
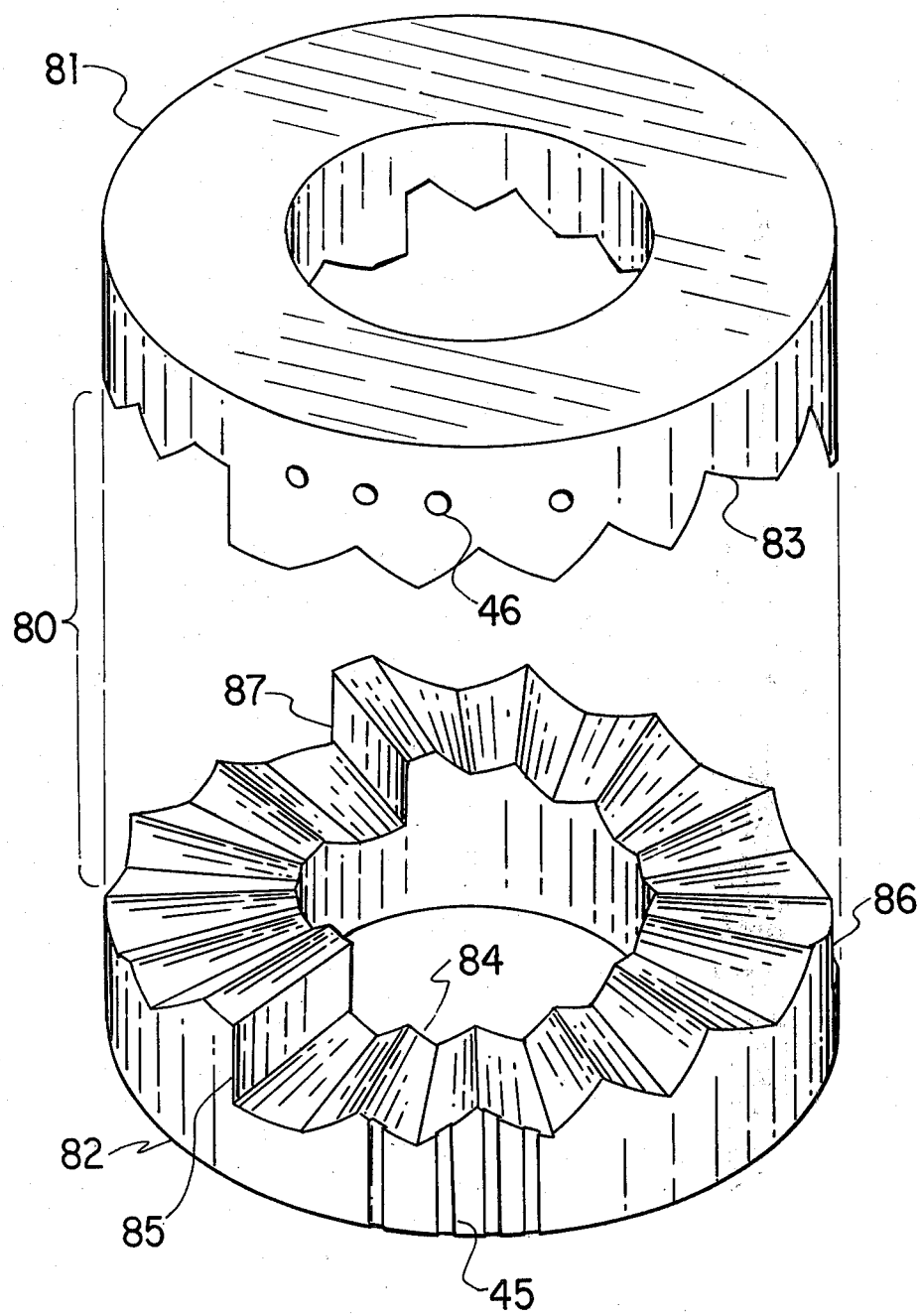
FIG. 4 shows an exploded view, of another embodiment of the two-piece shim.

Referring now to FIG. 4, there is illustrated an exploded view, on an enlarged scale, of a two-piece shim 80 consisting of serrated extension cams 81 and 82 having serrated end surfaces 83 and 84 respectively. Each serrated end surface consists of three identical serrated ramps, each extending over a 120° segment of the circumference of the end surface, and demarcated by walls 85, 86 and 87. Each serrated ramp comprises plural stepped identical serrations such as described in FIGS. 1 and 2 hereinbefore. As illustrated in FIG. 4, each ramp may have five serrations consisting of five peaks and five valleys, each vertically stepped from the other in equal increments. The end surface 83 of cam 81 is provided with three matching ramps with matching identical serrations which complementarily interfit the serrations of cam 82 and provide for identical increments. If, for example, each increment effects a 0.001 mm elongation of the overall length between the shim's parallel end surfaces, the maximum elongation available will be 0.04 mm. FIG. 4 also shows vertical depressions 45 on the vertical surface of the lower cam, in this case cam 82, and circular depressions 46 on the vertical wall of the upper cam, in this case, cam 83. As hereinbefore described, adjustment of either or both cams can be done with an instrument chosen to fit the particular projection or depression. In FIG. 4, those skilled in the art will recognize that an awl would suffice for both portions of the cam, and that a screwdriver would also be useful for adjustment of the bottom cam. It will further be apparent that the adjustment means can be provided on either or both of the cams, and that projections or depressions can be provided as may be required by the particular application to which the shim is put.

Shim 80, like shim 50, may be constructed with an arbitrary number of serrations having any preselected stepped profile, depending upon the size and purpose of the shim, and a serrated shim may be constructed with an arbitrary number of ramps. A particular advantage of a shim having three or more ramps is that the two-piece assembly provides for at least three support points so that a longitudinal axial load on the shim is stably supported. It will also be apparent that no particular advantage in this regard is offered by providing more than three ramps, though more or less ramps may be used for a particular purpose. For example, a shim with two ramps on each cam can provide only two support points at maximum extension of the shim. Such a shim is useful if a load is balanced about its axis, or to indicate imbalance of a load, which imbalance would be indicated by a rocking motion of the shim. In an application such as the seal of a Wankel engine, in which the load is restrained and balanced by external means, a single ramp becomes preferable, as this will allow the greatest amount of adjustment in the thickness of the shim.

The serrated shims described hereinabove are of particular usefulness in any situation where a space is to be maintained between oppositely disposed abutments, and that space is to be occupied by a rigid, incompressible spacing member or spacer. Such a situation arises, for example, in automobile body work where a panel is to be precisely spaced apart from a frame member. Still another common situation is where a drive shaft is to be drivingly coupled with a driven shaft, as for example, where a drive-motor means is coupled to the shaft of a centrifugal pump or the like.

Figure 5:
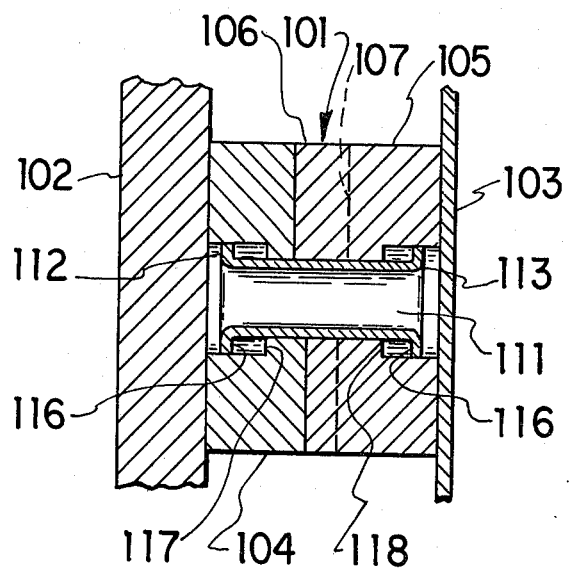
FIG. 5 illustrates an assembly of a two-piece shim assembled with a tubular rivet.
Figure 6:
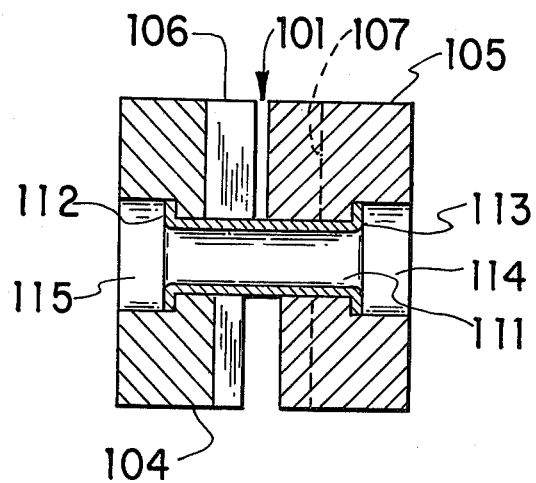
FIG. 6 shows the shim of FIG. 5 with the teeth sufficiently far apart to permit relative rotational movement between the cams.

In the situation mentioned hereinabove, now illustrated in FIGS. 5 and 6, where for example a shim is to be used as a stationary spacer between a frame member 102 and a body panel 103, the shim 101 comprises two serrated cams 104 and 105. The serrated cams 104 and 105 are shown in FIG. 5, after preadjustment and assembly with preselected serrations 106 of one serrated cam complementarily interfitted and engaged with the serrations 107 of the other. The serrations 106 and 107 are preferably provided in three helical ramps, demarcated one from the other by vertical or slightly inclined walls (not shown), as explained in more detail hereinabove in relation to FIG. 4. The cams 104 and 105 are held in radial alignment by a tubular rivet 111, and the cams are slidably and rotatably disposed on the rivet. The rivet 111 has flanges 112 and 113 retained in counterbores in the planar end surfaces of cams 104 and 105 respectively. The rivet 111 is loose enough to allow serrated cams 104 and 105 to be rotated over the full adjustment range of the stepped serrations of a ramp, and long enough to permit sufficient longitudinal axial displacement, relative to one another, to make any desired preadjustment, as illustrated in FIG. 6. Yet the rivet 111 is shorter than the minimum thickness of the shim 101 when all serrations 106 of the cam 104 are engaged with the serrations 107 of the cam 105, as shown in FIG. 5. The rivet is tubular, to allow passage of a bolt, pin, or the like.

In another embodiment of the invention, the rivet 111 can be made of an elastomeric material, and formed such that its length, measured between the inner edges 116 and 116' of flanges 112 and 113, is no greater than the distance between base portions 117 and 118 of counterbores 114 and 115 when the shim is adjusted to its minimum length, that is, when the matching peaks and valleys are in maximum engagement. In this embodiment, adjustment of the shim length will be maintained by the resilience of the rivet urging the cams one against the other at all times, irrespective of the adjustment. In this way, a shim can be preadjusted approximately and then installed, and final adjustment, if necessary, performed as set forth hereinabove, with the shim maintaining adjustment whether loose or installed. Those skilled in the art will realize that the elastomer selected for the rivet in this embodiment will depend on the particular application, taking into account such factors as ambient temperature, chemical environment and the like.

Modifications, changes, and improvements to the preferred forms of the invention herein disclosed, described and illustrated may occur to those skilled in the art who come to understand the principles and precepts thereof. Accordingly, the scope of the patent to be issued herein should not be limited to the particular embodiments of the invention set forth herein, but rather should be limited by the advance of which the invention has promoted the art.

I claim:

1. A shim comprising a first cam axially longitudinally interfitted with a second cam, said first cam having an end with a planar surface and an oppositely disposed end having a serrated helical surface, said second cam having an end with a planar surface and an oppositely disposed end having a serrated helical surface, at least one ramp in serrated helical surface of each cam, said ramp comprising plural, stepped circumferential serrations provided in said ramp, said serrations being in vertically stepped relationship one with another and terminating in a wall demarcating the highest serration from the lowest in said helical surface, said serrations of said first cam being complementarily interfitted with said serrations of said second cam, at least one surface of at least one cam having at least one adjustment means thereon, both said first and second cam having an axial bore hole and terminating in a relief at said planar surface of said cams, said cams being loosely coupled by a shaft having a flanged portion at each end, said shaft being shorter in length than the minimum thickness of said shim with said serrated surfaces in full engagement, and said reliefs being deep enough to allow said first cam and said second cam to be separated sufficiently to allow adjustment to the maximum thickness of said shim.

* * * * *